Oct. 9, 1928.

Re. 17,102

H. L. WADSWORTH

SAND MIXING APPARATUS

Original Filed May 12, 1923 3 Sheets-Sheet 1

INVENTOR.

Howard L. Wadsworth

BY Fay, Oberlin & Fay

ATTORNEYS

Oct. 9, 1928.

Re. 17,102

H. L. WADSWORTH

SAND MIXING APPARATUS

Original Filed May 12, 1923 3 Sheets-Sheet 2

INVENTOR.

Howard L. Wadsworth

BY

Fay, Oberlin & Fay

ATTORNEYS.

Oct. 9, 1928.

Re. 17,102

H. L. WADSWORTH

SAND MIXING APPARATUS

Original Filed May 12, 1923 3 Sheets-Sheet 3

INVENTOR.
Howard L. Wadsworth
BY
Fay, Oberlin & Fay
ATTORNEYS.

Reissued Oct. 9, 1928.

Re. 17,102

UNITED STATES PATENT OFFICE.

HOWARD L. WADSWORTH, OF CLEVELAND, OHIO, ASSIGNOR, BY MESNE ASSIGNMENTS, TO R. H. CLEMINSHAW, OF CLEVELAND, OHIO.

SAND-MIXING APPARATUS.

Original No. 1,566,133, dated December 15, 1925, Serial No. 638,498, filed May 12, 1923. Application for reissue filed April 6, 1927. Serial No. 181,582

The present invention, relating, as indicated, to sand-mixing apparatus, is more particularly directed to an improved sand cutting or mixing machine for use in pulverizing, mixing and preparing molded sand in foundries after use. A further object of the invention is the provision of a portable machine of the above type which shall be extremely simple in its construction, easy to operate and of light weight. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Figure 1:
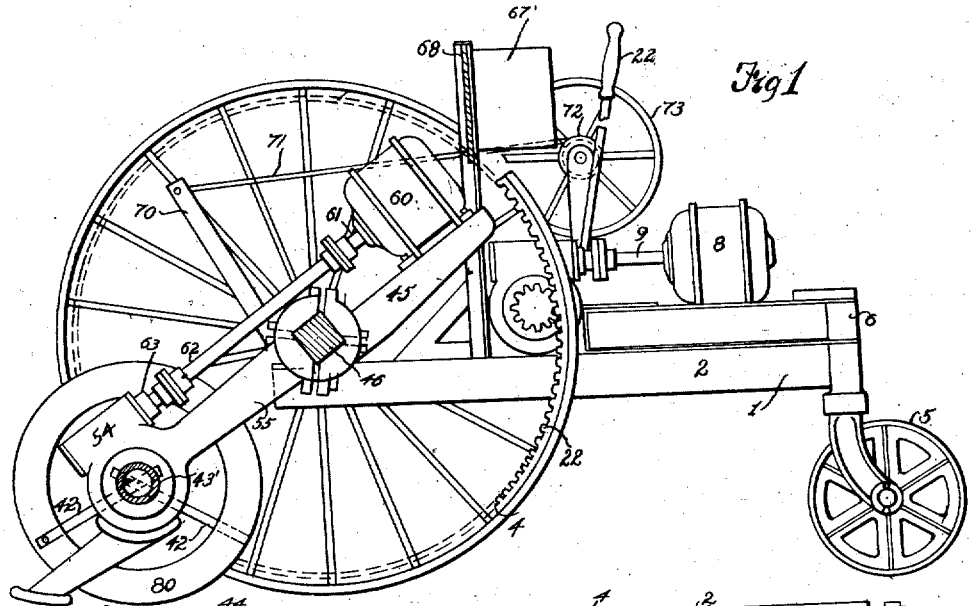
Figure 2:
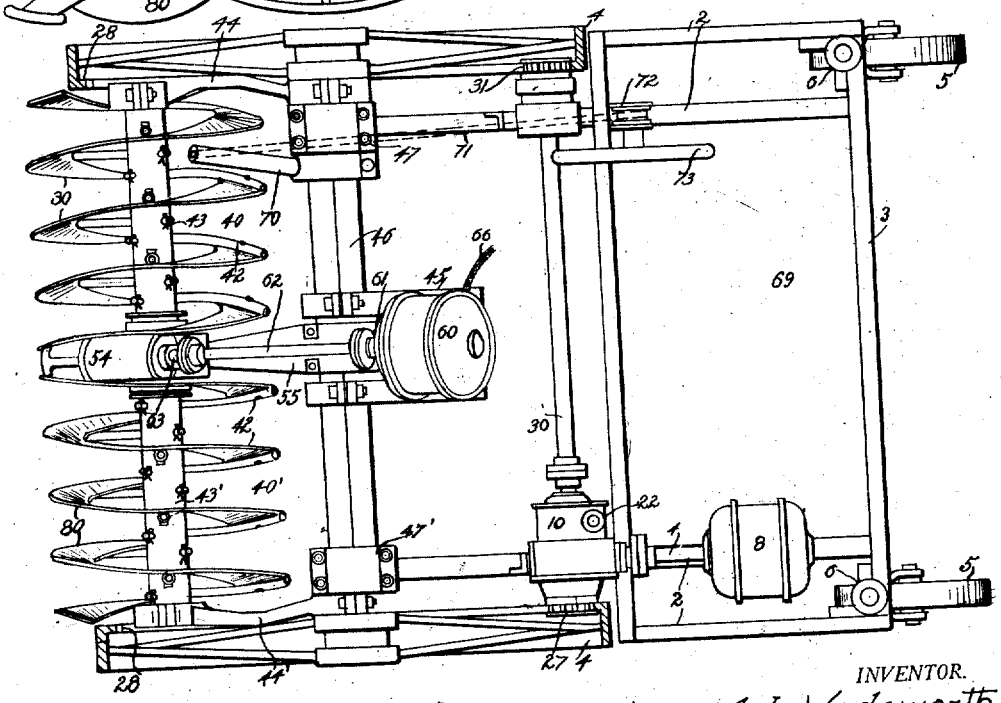
Figure 3:
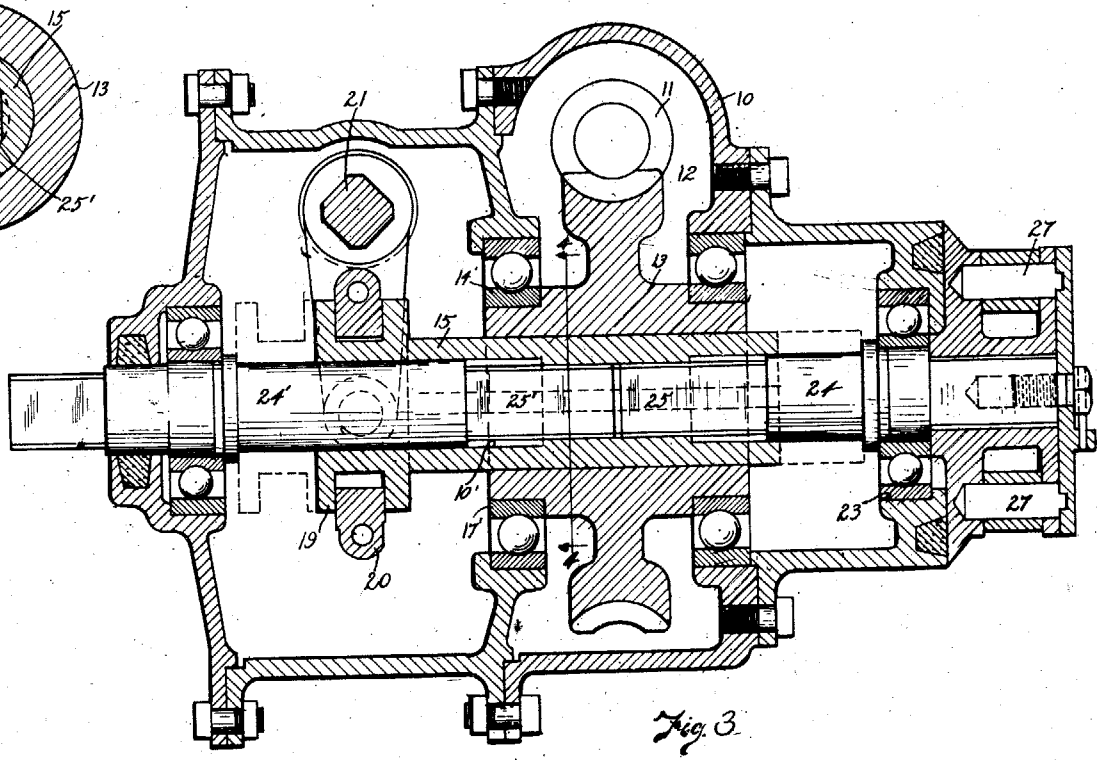
Figure 4:
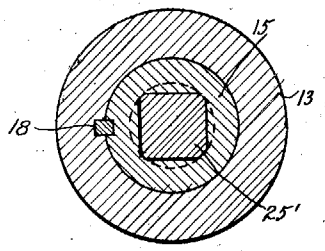
Figure 5:
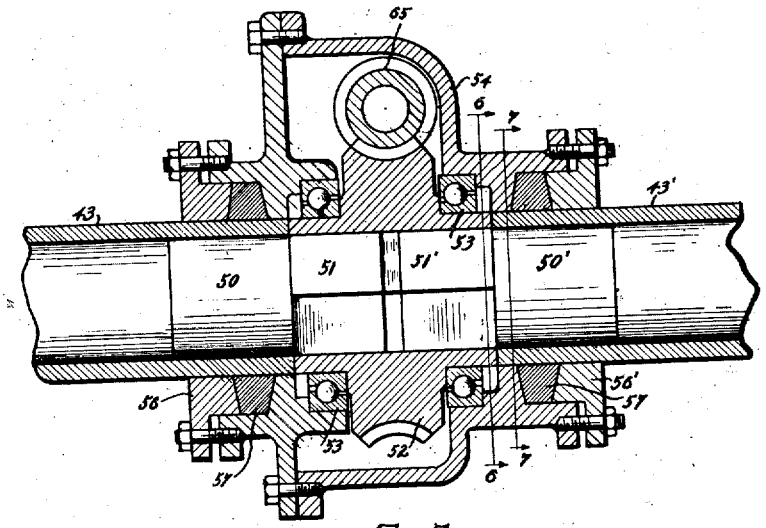
Figure 6:
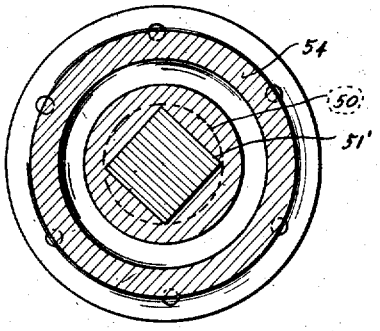
Figure 7:
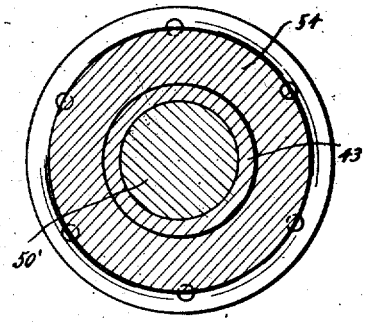

Fig. 1 is a side elevation of my improved machine; Fig. 2 is a plan view of the same; Fig. 3 is a central vertical section through the transmission mechanism; Fig. 4 is a section on the line 4—4 in Fig. 3; Fig. 5 is a vertical longitudinal section through the driving means for the cutting cylinder; Fig. 6 is a section on the line 6—6, Fig. 5; and Fig. 7 is a section on the line 7—7, Fig. 5.

In Fig. 1 the machine is shown as consisting of a rectangular frame 1, provided with longitudinal members 2 and cross members 3, which is supported upon traction wheels 4 and small caster wheels 5, the latter being pivotally mounted in housings 6, which are secured to opposite corners of the frame.

The means for propelling the machine over the ground consist of a motor which is here shown in the form of an electric motor 8 operating a shaft 9 which enters a transmission case 10 and is there provided with a worm 11 driving a worm gear 12. This worm gear 12 is provided with a broadened hub portion 13 which is mounted within two spaced roller bearings 14 and 14′, which are carried in the case 10. Slidably mounted within hub 13 of the worm gear is a sleeve 15, which is provided with two aligned circular openings 16 and 16′, and with aligned square openings 17 and 17′. This sleeve is non-rotatably secured within the hub 13 by means of one or more keys 18 and may be shifted longitudinally of the hub by means of a collar 19 secured to the sleeve and a shifting yoke 20 operated by means of a square shaft 21, which extends through an opening in the case 10 and is there engaged by means of a handle 22.

Rotatably mounted within the sleeve 15 and in bearings 23 and 23′ mounted in the case are two driving shafts 24 and 24′, each of which is provided with a circular portion which is borne in the circular portion of the sleeve 15 and with square portions 25 and 25′, which are engaged in a driving relation by the squared portion of the sleeve 17, depending upon the position of the sleeve. The shaft 24 is connected to a driving gear which consists of a series of pins 27 engaging in an internal gear 28 in the wheel 4, while the shaft 24′ is removably secured to a shaft 30 which extends transversely of the machine, and at its end is connected to a second driving gear 31 which in turn engages an internal gear on the other of the two traction wheels 4 so that simultaneous operation of the shafts 24 and 24′ causes simultaneous operation and driving of the two traction wheels.

The present transmission affords a simple means of steering the machine by disconnecting the drive from one or the other of the driving shafts 24 and 24′, which is effected by movement of the handle 22 to rotate the shaft 21 and in this way shift the collar or sleeve 15 longitudinally of the two shafts 24 and 24′ to disengage the squared portion of the sleeve 15 from one or the other of the squared ends of the shafts 24 and 24′. When this is done the shaft whose squared portion is disconnected from the squared portion of the sleeve is undriven, the sleeve rotating freely on the circular portion of the shaft.

The sand-cutting mechanism of the present machine consists of a sand-cutting cylinder made up of two series of oppositely extending spirals 40 and 40′, which are in the form of blades mounted upon rods 42 set in central hollow members 43 and 43′. This cutting cylinder is carried in a framework which is provided with two forwardly extending arms 44 and 44′ and a rearwardly extending support 45. These two members 44, 44′ and 45 are rigidly secured together about a heavy square shaft 46 which is rotatably mounted in suitable housings 47, 47′ at the forward end of the frame members 2. The ends of this square shaft 46 are formed round and provided with suitable friction bearings, upon which the traction wheels 4 are mounted, so that the wheels turn freely with respect to the square shaft, while the square shaft can in turn be oscillated in order to position the cutting cylinder at different levels, and to lift it into and out of operation with a pile of sand.

The construction of the cutting cylinder is best shown in Fig. 5. The two members 43 and 43′ are tubes, into the adjacent inner ends of which are integrally secured plugs 50 and 50′, which are provided with squared ends 51 and 51′. These squared ends are non-rotatably but slidably secured within a square opening in a worm gear 52, which is rotatably mounted in suitable bearings 53 in a housing or case 54, which is carried on a central supporting arm 55 extending forwardly from the square shaft 46. The cylinder construction, involving as it does the use of only two ordinary tubes, into which the square plugs are secured, is simple and inexpensive, while exact alignment between the two tubes is effected by mounting these tubes in removable caps 56 and 56′, which are secured against the outer sides of the casing 54, while between these caps and casing are packing glands 57. The blades 40 and 40′ are secured, as stated, to the ends of rods 42, which are passed through holes bored through the tubes 43, 43′, (Fig. 1) and there secured by any suitable means.

The driving mechanism for the cutting cylinder consists of an electric motor 60 mounted upon the rearwardly extending arm or platform 45, and weighted and positioned to partially, but not completely, counterbalance the weight of the cutting cylinder. A certain amount of weight is desired in the cutting cylinder to maintain it in position in the sand pile and to stabilize it as it cuts its way through the pile, and while it would be entirely possible to completely counterbalance this cylinder, I have found that a still better construction is to partially counterbalance the cylinder as here shown.

Removably secured to the shaft 61 of the motor is a shaft 62, which in turn is removably secured to a shaft 63 entering the case 54, and carrying a worm 65 which engages and drives the worm gear 52. It will be understood that a flexible cable 66 will lead from the motor to suitable switches carried in a casing 67 on a dashboard 68 mounted centrally of the vehicle and adjacent to the operating handle 22 of the transmission so that an operator when standing or sitting upon the platform 69 at the rear of the machine can conveniently control the transmission and the operating switch for the motor 66. Similarly the motor 8 is controlled from a switch located in the same casing 67.

One of the important features of the present machine is the arrangement of the units about the main shaft 46 in such a way that by far the greater part of the weight of the machine is carried upon this shaft and therefore upon the large traction wheels 4. When in operation probably 90 per cent of the entire weight of the machine is borne by the traction wheels, and this allows the use of very much smaller and narrower follower or caster wheels than would otherwise be possible, and prevents any cutting or digging of the floor of the foundry by these wheels, which in other machines, in which the weight is not so distributed, has been found to be a serious disadvantage. It is impossible, or at least very undesirable, to use very large caster wheels, and caster wheels of the usual types are sufficiently small and narrow so that they dig into the soft floors of the foundry very readily in the usual machines.

The framework upon which is carried the cutting cylinder and motor therefor may be lifted from the position shown in Fig. 1 into a position with the cutting cylinder sufficiently high above the ground to clear the ordinary sand pile by means of an arm 70, chain 71 attached thereto and the sprocket or pulley 72, to which the other end of the chain is secured. This sprocket is operated by means of a hand wheel 73 which is mounted at the side of the operator's platform, and may be locked in any desired position by means of any suitable pawl, or other device, (not shown).

The motor 8 is of the reversing type so that the machine may be run in either direction, and of course the two motors 8 and 60 may be operated independently so that the machine may be conveniently run from one point of the foundry to the other without operating the cutting cylinder during this travel.

The action of the cutting cylinder, shown in Figs. 1 and 2, as it advances into a sand pile, is to cut successive narrow slices of sand from the face of the pile, then "worm" or screw these slices toward the center of the cutting cylinder, and at the center to discharge the two slices of sand rearwardly behind the machine. It is understood that the machine is traveling in the direction of the arrow A in Fig. 1 and that the sand pile is in front of the machine and is cut during this advancing movement of the machine and thrown out behind the cutting cylinder and left in a ridged heap.

The cutting cylinder has its blades 80 inclined to a radial plane at each point, and the action of these blades is to slice into the sand pile at an angle instead of flatly. This requires very much less power and effects a throwing of the sand toward the center of the two cylinders rather than a slow worming or rolling over of the sand as it is moved toward the center. A further difference in the operation of this type of cylinder is that the sand is crossed at the center of the cylinder, that is, the sand from one side of the original heap is scattered to a greater extent than before across the center and over to the other side of the heap, although with both types of cylinders the sand is left in a ridged heap.

By supporting the greater portion of the entire weight of the machine on the large traction wheels, and by providing a balanced drive for the two traction wheels, that is, a direct drive to each wheel, I have found that it is unnecessary to provide any equalization between the follower wheels 5. The framework of the machine is sufficiently rigid so that if one of the wheels 5 passes over a recess in the floor there is no tendency of the drive, as would be the case if only one traction wheel were driven, to tilt the machine into this recess, and the follower wheel will simply pass over the recess, but without dropping into it and without placing any undue strain on the framework of the machine. In addition to the above advantage the use of the extremely heavy square shaft, upon which both the traction wheels and the cutting cylinder are mounted, maintains these parts in perfect alignment at all times and prevents the very severe racking of the machine, which is a serious objection in many sand-cutting machines, due to the weight and unequal resistance which is met with by different parts of the sand-cutting cylinder, and which tends to swing the cylinder in its supports and to thus strain the entire framework and to cause misalignment from the bearings of the cutting cylinder and from the wheels of the machine.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a sand cutter, the combination of a frame, wheels supporting the same, a sand cutting cylinder rotatably mounted in said frame, said cylinder having two series of blades, each terminating closely adjacent to the center of said cylinder, and driving means including a shaft operatively connected to the center of said cylinder between said two series of blades.

2. In a sand cutter, the combination of a frame, wheels supporting the same, a sand cutting cylinder rotatably mounted in said frame, said cylinder having two series of blades mounted on said cylinder, each terminating closely adjacent the center thereof, and means including an element mounted on said cylinder between said series of blades and a shaft operatively engaging same, said means being adapted to rotate said cutting cylinder.

3. In a sand cutter, the combination of a frame, wheels supporting the same, a sand cutting cylinder rotatably mounted in said frame, a driven element mounted centrally on said cylinder, two series of sand cutting elements mounted on said cylinder and terminating closely adjacent said driven element, and means including a shaft at right angles to said cylinder, said shaft engaging said driven element for driving the same and said cylinder therethrough.

4. In a sand cutter, the combination of a frame, wheels supporting the same, a sand cutting cylinder rotatably mounted in said frame, two series of sand cutting blades, said series being mounted on said cylinder and being slightly spaced from each other at a point adjacent the center of said cylinder, a worm gear fixed to said cylinder between said two series of blades, a worm engaging said gear, and means for driving said gear.

5. In apparatus of the character described, the combination of a sand cutting cylinder including two aligned members provided with polygonal adjacently disposed ends, opposed spiral cutting blades mounted on said members and radially spaced therefrom, the ends of said blades overlapping the polygonal ends of said two aligned members, a hollow driven element provided with a hub, said polygonal ends of said aligned members being slidable but non-rotatably engaged in said hollow driven element, a worm wheel mounted on said hollow driven element, and a worm disposed within the adjacent ends of said cutting blades, said worm being in driving engagement with said worm wheel.

6. In apparatus of the character described, the combination of a sand cutting cylinder including two aligned members provided with polygonal adjacently disposed ends, opposed spiral cutting blades mounted on said two members, said blades being spaced radially from said members and having their adjacent ends overlapping the same, a hollow driven element provided with a hub, said polygonal ends of said aligned members being slidable but non-rotatably engaged in said hollow driven element, a fixed casing enclosing said driven element, bearing means mounted in said casing and supporting said element, and means including a worm and worm gear mounted in said casing and driving said driven element, said worm gear being disposed at right angles to the plane of said two aligned members and lying partially radially within the adjacent ends of said spiral blades.

7. In a machine of the character described, the combination of a frame, a plurality of wheels including a pair of traction wheels supporting said frame, a shaft rotatably mounted in said traction wheels, said shaft being oscillatorially mounted in said frame, a sub-frame fixed to said shaft and extending on either side thereof, a sand cutting cylinder mounted in said sub-frame on one side of said shaft, said cylinder including two opposed spiral blades terminating adjacent the center of the same, a motor mounted on the other side of said frame from said cylinder, said motor being weighted and positioned to partially counter-balance said cylinder, and means connecting said motor and cylinder whereby the former may operate the latter, said means including mechanism disposed between the adjacent ends of said spiral blades.

8. In a machine of the character described, the combination of a frame, a plurality of wheels including a pair of traction wheels supporting said frame, a shaft rotatably mounted in said traction wheels, said shaft being oscillatorially mounted in said frame, a sub-frame fixed to said shaft and extending on either side thereof, a sand cutting cylinder mounted in said sub-frame on one side of said shaft, said cylinder including two opposed spiral blades terminating adjacent the center of the same, a motor mounted on the other side of said frame from said cylinder and centrally with respect to said cylinder, driving means connecting said motor with the center of said cylinder for operating the latter, said means including mechanism disposed between the adjacent ends of said spiral blades, said motor being weighted and positioned to partially counter-balance said cylinder.

9. In a machine of the character described, the combination of a frame, a plurality of wheels including a pair of traction wheels supporting said frame, a shaft rotatably mounted in said traction wheels, said shaft being oscillatorially mounted in said frame, a sub-frame fixed to said shaft and extending on either side thereof, a sand cutting cylinder mounted in said sub-frame on one side of said shaft, said cylinder including two opposed spiral blades terminating adjacent the center of the same, a motor mounted on the other side of said frame from said cylinder and centrally with respect to said cylinder, driving means connecting said motor with the center of said cylinder for operating the latter, said means including mechanism disposed between the adjacent ends of said spiral blades, said motor being weighted and positioned to partially counter-balance said cylinder, and manually operated means adapted to oscillate said sub-frame and fix the same in any desired position.

10. In a machine of the character described, the combination of a frame comprising spaced parallel side members, spaced transverse members connecting said side members and said side members extending a substantial distance beyond said transverse members, wheels mounted on said frame and supporting the same, a rigid shaft provided with a polygonal portion intermediate its ends rotatably mounted in and bracing together said side members of said frame, traction wheels rotatably mounted on the extending ends of said shaft, and sand cutting means supported on said rigid shaft.

11. In a machine of the character described, the combination of a horizontally disposed frame comprising two spaced parallel side members, a transverse member secured to said side members at adjacent ends thereof, a second transverse member secured to said side members intermediate their ends, a rigid shaft provided with a centrally disposed polygonal portion, said shaft being oscillatorially mounted in said side members at the otherwise unconnected ends thereof and serving to connect and brace said side members against lateral distortion, traction wheels supporting said frame and rotatably mounted on the outer ends of said rigid shaft, and a sand cutting cylinder supported upon the polygonal central portion of said rigid shaft.

12. In a machine of the character described, the combination of a frame comprising two spaced parallel side members, means connecting said two side members, said means being disposed on one side of the center of each of said two side members, thereby leaving the other portions of said side members in a parallel but unconnected relation, and bracing means for said extending portions of said side members including a rigid shaft element oscillatorially mounted in each of said side members, said shaft being adapted to maintain the extending portions of said side members in substantial rigid parallelism.

Signed by me, this 2nd day of April, 1927.

HOWARD L. WADSWORTH.